United States Patent Office.

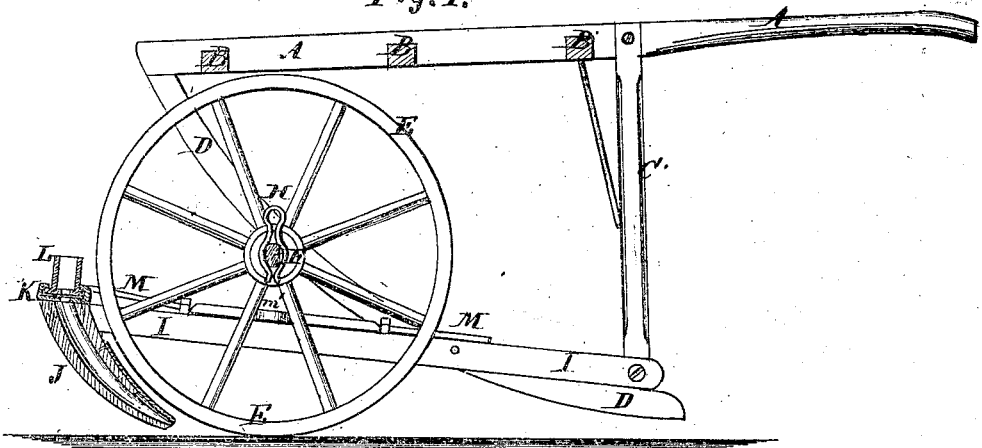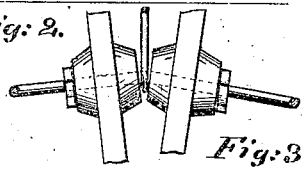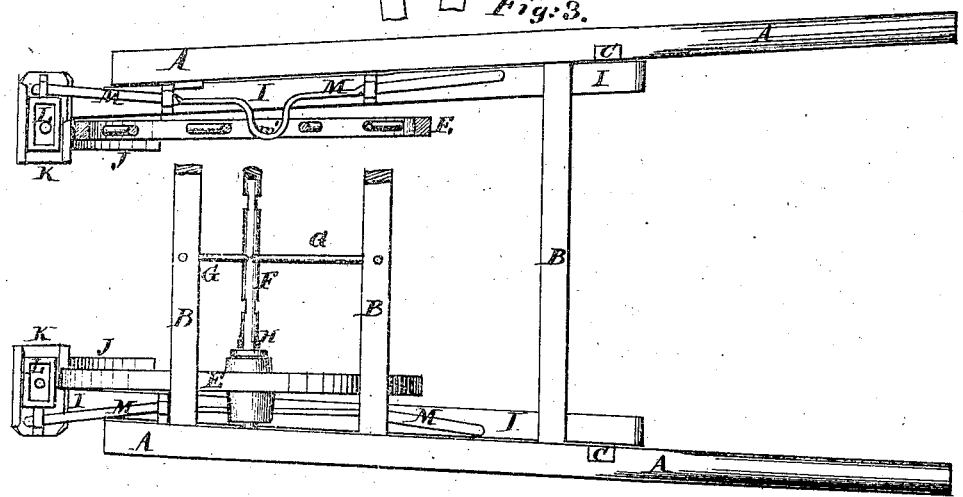

ALBERT M. NEWLAND, OF OLIVET, MICHIGAN.

Letters Patent No. 104,983, dated July 5, 1870.

IMPROVEMENT IN COMBINED CART, WHEELBARROW, AND TURNIP-DRILL.

The Schedule referred to in these Letters Patent and making part of the same.

To all whom it may concern:

Be it known that I, ALBERT M. NEWLAND, of Olivet, in the county of Eaton and State of Michigan, have invented a new and useful Improvement in Combined Cart, Wheelbarrow, and Turnip-Drill; and I do hereby declare that the following is a full, clear, and exact description thereof, which will enable others skilled in the art to make and use the same, reference being had to the accompanying drawing forming a part of this specification, in which—

Figure 1 is a detail vertical longitudinal section of my improved machine.

Figure 2 is a detail front view of the wheels and axle when adjusted as a wheelbarrow.

Figure 3 is a top view of the same, part being broken away to show the construction.

Similar letters of reference indicate corresponding parts.

My invention has for its object to furnish a simple and convenient machine, which shall be so constructed and arranged that it may be easily and quickly adjusted for use as a hand-cart, wheelbarrow, or turnip-drill; and It consists in the construction and combination of the various parts of the machine, as hereinafter more fully described.

A are the side bars of the main frame, the forward parts of which are connected by cross-bars B, and upon the rear ends of which are formed the handles by which the machine is propelled.

C are the standards or legs of the machine, the upper ends of which are attached to the rear parts of the side bars A, and the lower ends of which are attached to the lower or rear ends of the curved braces D, the upper or forward ends of which are attached to the forward ends of the side bars A.

E are the wheels, two of which are used, and which revolve upon the axle F, the ends of which are attached to the brace-bars D in such positions that the wheels E may revolve beneath the forward part of the frame A B, thus bringing the load more directly over the wheels, and causing the propelling power to be applied more nearly in a horizontal direction than when the wheelbarrow is constructed in the ordinary manner.

The axle F is slightly raised in its center, as shown in fig. 2, and to its central part are attached the lower ends of the brace-bars or rods G, the upper ends of which are attached to the cross-bars B of the frame A B, as shown in fig. 3.

By securing the wheels E to the outer parts of the axle F, the machine becomes a hand-cart.

By securing the wheels E to the middle and slightly inclined parts of the said axle F, the lower parts of the rims of the said wheels E will be brought close together, while their upper parts will be spread somewhat apart, and the machine becomes a wheelbarrow.

The wheels E are secured in place, when adjusted upon the axle F, by spring-keys or linch-pins H, as shown in figs. 1 and 2.

I are bars or arms, the rear ends of which are detachably pivoted to the lower parts of the inner sides of the standards or legs C by means of screws or bolts as shown in fig. 1.

The bars or arms I, extend along the inner sides of the brace-bars D, and their forward ends project a little in front of the wheels E.

To the inner sides of the forward ends of the bars I are attached the upper ends of the shoes J, which are curved downward and rearward, to correspond somewhat with the curve of the wheels E, and their lower ends are so formed as to mark the ground to receive the seed.

The shoes J are made hollow, to serve as conductor-spouts to conduct the seed to the ground.

To the upper ends of the shoes J are attached grooved plates K, in the grooves of which slide the the seed-hoppers L.

In the plates K and bottoms of the hoppers L are formed holes, so that when the hole in the bottom of the hoppers comes over the hole in the grooved plates K, a few kernels of the seed may drop through into the hollow of the shoes J, through which it passes to the ground.

M is a spring lever, which passes through staples or keepers attached to the upper sides of the bars I, as shown in figs. 1 and 3, so that when the middle parts of the spring levers M are moved laterally, the end parts of the said spring levers will also be moved at the same time laterally in the opposite direction.

The forward parts of the spring levers M pass through keepers attached to the hoppers L, so that the said hoppers will be moved by and with the levers M, to agitate the seed and cause it to pass out freely, and a few kernels at a time.

Upon the inner side of the middle part of each of the spring levers M is formed a curved projection, $m'$, as shown in fig. 3, so that it may be struck, and the said levers operated to oscillate the hoppers as the machine is drawn forward, by the spokes of the wheels E, as shown in fig. 3.

The seeds are pressed down into the ground by the wheels E, which follow the marks made by the shoes J.

When it is desired to draw the machine, when dropping the seed, the shoes J and their attached hoppers are detached from the forward ends of the bars I, are exchanged, reversed, and attached to the inner sides of the bars I, in the rear of the wheels E, the hoppers L being, in this case, connected with the rear ends of the spring levers M.

In case it is desired to plant the rows wider apart, so that the plants may be cultivated with a horse, the axle F may be replaced with a longer one, that will allow the wheels E to be placed upon the outside of the standards and braces C D, and the bars I detached, exchanged, and pivoted to the outer sides of the standards C.

Having thus described my invention,

What I claim as new and desire to secure by Letters Patent, is—

1. The combination of the side bars A, cross-bars B, standards C, curved braces D, adjustable wheels E, and axle F, with each other, said parts being constructed and arranged substantially as herein shown and described and for the purposes set forth.

2. The axle F, bent upward at its center, and provided with the notches, whereby the wheels E may be adjustably secured on said axle, and thus arranged together or apart, as shown and described, for the purposes specified.

3. The combination of the pivoted bars I, hollow shoes J, hoppers L, and spring levers M $m'$, with each other, and with the frame A B C D, wheels E, and axle F, substantially as herein shown and described and for the purpose set forth.

ALBERT M. NEWLAND.

Witnesses:
GEO. W. KEYES,
H. HERRICK.